(12) United States Patent
Taylor

(10) Patent No.: US 8,190,746 B2
(45) Date of Patent: May 29, 2012

(54) EXPLICIT CASUALTY CONTROL IN A CLIENT/SERVER SYSTEM

(75) Inventor: Owen Taylor, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 539 days.

(21) Appl. No.: 11/565,364

(22) Filed: Nov. 30, 2006

(65) Prior Publication Data

US 2008/0133756 A1    Jun. 5, 2008

(51) Int. Cl.
*G06F 15/16* (2006.01)

(52) U.S. Cl. ......... 709/227; 709/224; 709/225; 709/226

(58) Field of Classification Search .......... 709/224–227; 707/201–203
See application file for complete search history.

(56) References Cited

U.S. PATENT DOCUMENTS

| | | | | | |
|---|---|---|---|---|---|
| 6,125,368 | A | * | 9/2000 | Bridge et al. | 707/201 |
| 6,742,059 | B1 | * | 5/2004 | Todd et al. | 710/19 |
| 6,954,799 | B2 | * | 10/2005 | Lerner | 709/240 |
| 7,136,927 | B2 | * | 11/2006 | Traversat et al. | 709/230 |
| 7,359,894 | B1 | * | 4/2008 | Liebman et al. | 707/3 |
| 2005/0050106 | A1 | * | 3/2005 | Wenner et al. | 707/200 |
| 2005/0246682 | A1 | * | 11/2005 | Hines | 717/109 |
| 2006/0206616 | A1 | * | 9/2006 | Brown | 709/229 |
| 2006/0230061 | A1 | * | 10/2006 | Sample et al. | 707/103 R |
| 2007/0038594 | A1 | * | 2/2007 | Goodwin et al. | 707/2 |
| 2007/0204078 | A1 | * | 8/2007 | Boccon-Gibod et al. | 710/54 |
| 2007/0260544 | A1 | * | 11/2007 | Wankmueller | 705/44 |
| 2008/0242277 | A1 | * | 10/2008 | Chen et al. | 455/414.2 |

* cited by examiner

*Primary Examiner* — Wing Chan
*Assistant Examiner* — Hitesh Patel
(74) *Attorney, Agent, or Firm* — Lowenstein Sandler PC

(57) ABSTRACT

Embodiments of the present invention provide a protocol for ensuring data integrity of requests made by clients of a social network service. In particular, when a client gets a confirmation from an update request, the confirmation is accompanied by a token that provides information about the update. When the client next makes a read request it passes the token along with the read request. The node at the social network service receiving the request then waits until it makes sure that it has received any notifications that precede the state represented by the token before it processes the request and replies to the client. The token might be, among other things, a physical timestamp, a counter reflecting transactions committed on a database server, or a vector timestamp. In addition, the same technique can be used to ensure ordering between read requests.

13 Claims, 3 Drawing Sheets

EXPLICIT CASUALTY CONTROL IN A CLIENT/SERVER SYSTEM

FIELD OF THE INVENTION

The present invention relates to online services and communications tools.

BACKGROUND OF THE INVENTION

In its short history, Internet usage has been mainly driven by portals and search engines, such as Yahoo! and Google. Recently, the rapid growth of social networking sites, such as MySpace and Facebook, has revealed a new trend of Internet usage. Social networking generally relates to services and tools that help users maintain and expand their circles of friends usually by exploiting existing relationships. Social networking sites have shown potential to become the places on the Internet where many people spend most of their time, thus making these sites the main entry point for online activity. Often times, these social networking sites can become the focal point of sharing information, such as links, multimedia, music, and the like.

In general, social networking sites and other online services of the Internet offer a mix of features and tools, such as message boards, games, journals or web logs ("blogs"). One of the main features utilized by social network sites is file transfers and downloads.

File transfers in a network computer system is a well-known concept. For example, in the early days of the Internet, file transfers were accomplished by connecting to a destination computer and executing a file transfer command (e.g. FTP). This type of data transfer can be referred to as a client-server model.

The client-server model of data transfer has disadvantages and faults. For example, if several servers store copies, i.e., mirrors, of a file, these servers can be rapidly overwhelmed in response to a spike of popularity of the file. Accordingly, the user experience in obtaining these files may be less than satisfactory.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide a protocol for ensuring data integrity of requests made by clients of a social network service. In particular, when a client gets a confirmation from an update request, the confirmation is accompanied by a token that provides information about the update. When the client next makes a read request it passes the token along with the read request. The node at the social network service receiving the request then waits until it makes sure that it has received any notifications that precede the state represented by the token before it processes the request and replies to the client. The token might be, among other things, a physical timestamp, a counter reflecting transactions committed on a database server, or a "vector timestamp," which may be a set of counters with one counter reflecting the state of each node. Each node in the social network service maintains a vector which reflects the latest update notification it has seen from the other nodes. In addition, the same technique can be used to ensure ordering between read requests.

Reference will now be made in detail to the exemplary embodiments of the invention, which are illustrated in the accompanying drawings. Wherever possible, the same reference numbers will be used throughout the drawings to refer to the same or like parts.

Figure 1:
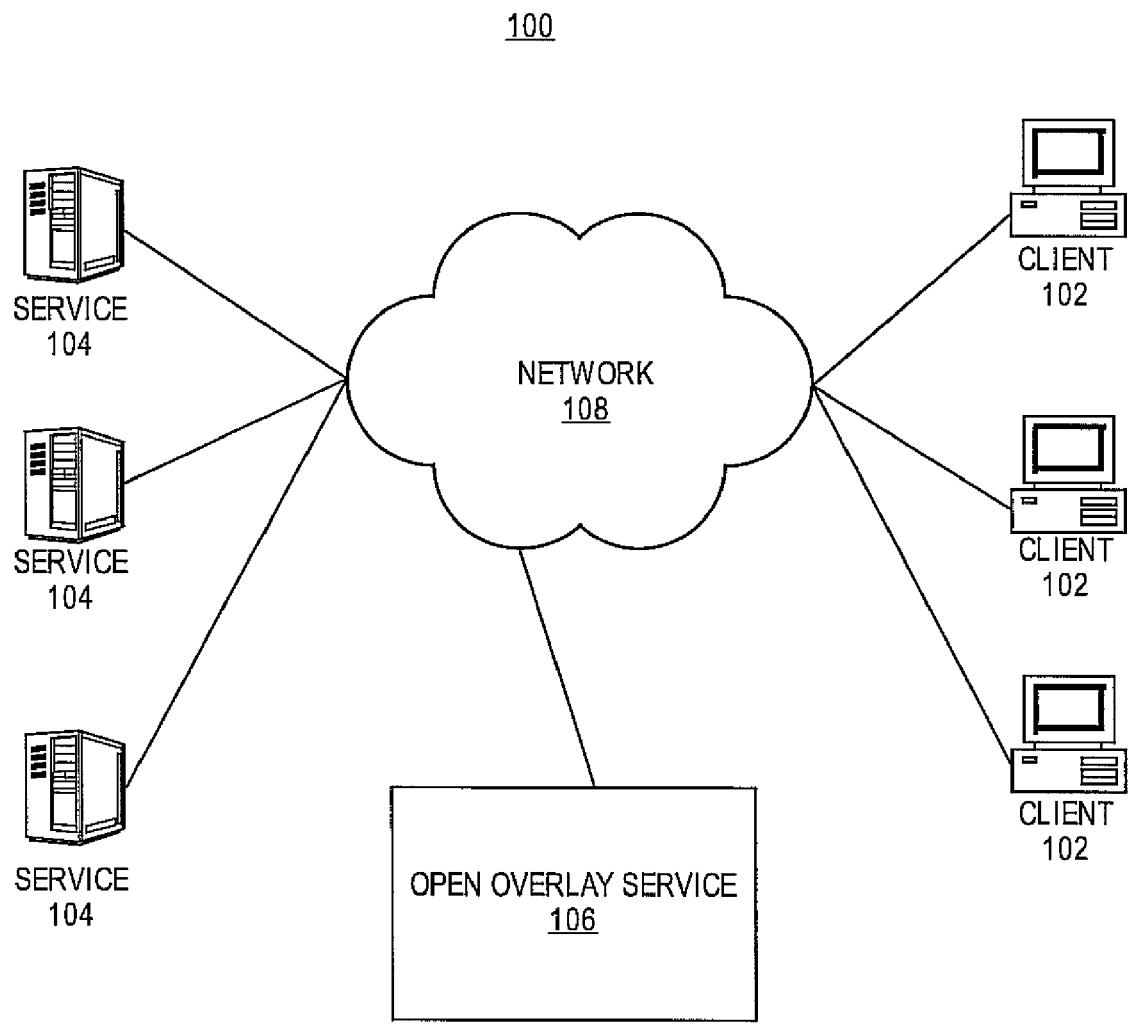
FIG. 1 illustrates an exemplary system that is in accordance with embodiments of the present invention.

FIG. 1 illustrates a system 100 that is consistent with the principles of the present invention. As shown, the system 100 may comprise one or more clients 102, a plurality of services 104, an open overlay service 106, and a network 108. In general, system 100 may be implemented on a widely available data network, such as the Internet. For example, system 100 may be implemented as a combination web site and client application that enables users and friends to participate in a live social context. These components will now be generally described.

Client 102 provides a user interface for system 100. Client 102 may be implemented using a variety of devices and software. For example client 102 may be implemented on a personal computer, workstation, or terminal. In addition, client 102 may run under an operating system, such as the LINUX operating system, the Microsoft™ Windows operating system, and the like. Client 102 may also operate through an Internet browser application, such as Firefox by Mozilla, Internet Explorer by Microsoft Corporation, or Netscape Navigator by Netscape Communications Corporation.

One skilled in the art will also recognize that client 102 may be implemented with various peripheral devices, such as a display, one or more speakers, and other suitable devices. Client 102 may also be implemented with various peripherals for accepting input from a user, such as a keyboard, a mouse, and the like. Although FIG. 1 shows a number of clients 102, system 100 may include any number of clients.

Services 104 are the applications and services that users of system 100 already use. Services 104 may be implemented on one or more servers that are well known to those skilled in the art. Rather than recreating functionality, open overlay service 106 merely interfaces services 104 and allows users to seamlessly continue using the services, such as social networking services, instant messaging, etc., that they currently use. Examples of services 104 include iTunes, Yahoo Music Engine, MySpace, Friendster, AOL Instant Messenger, Yahoo! Messenger, etc. Any sort of online service may be incorporated into the context provided by open overlay service 106.

Open overlay service 106 serves as a social network service and stores, manages, and provides access control to the various services and social networks of clients 102. In general, open overlay service 106 is essentially a web site and application service that stores and forwards information shared by users, as well as user profiles and social network information. Open overlay service 106 may be hosted as a public instance, similar in fashion to a service, such as Wikipedia. In addition, open overlay service 106 may provide various application programming interfaces that have an open specification so that anyone can create an interface.

For example, open overlay service 106 may process requests to retrieve an object, document, image file, web page, and the like. Open overlay service 106 may be implemented using a variety of devices and software. For example, open overlay service 106 may be implemented as a web site running on one or more servers that support various application programs and stored procedures.

The components of system 100 may be coupled together via network 108. Network 108 may comprise one or more networks, such as a local area network, the Internet, or other type of wide area network. In addition, network 108 may support a wide variety of known protocols, such as the transport control protocol and Internet protocol ("TCP/IP") and hypertext transport protocol ("HTTP").

Figure 2:
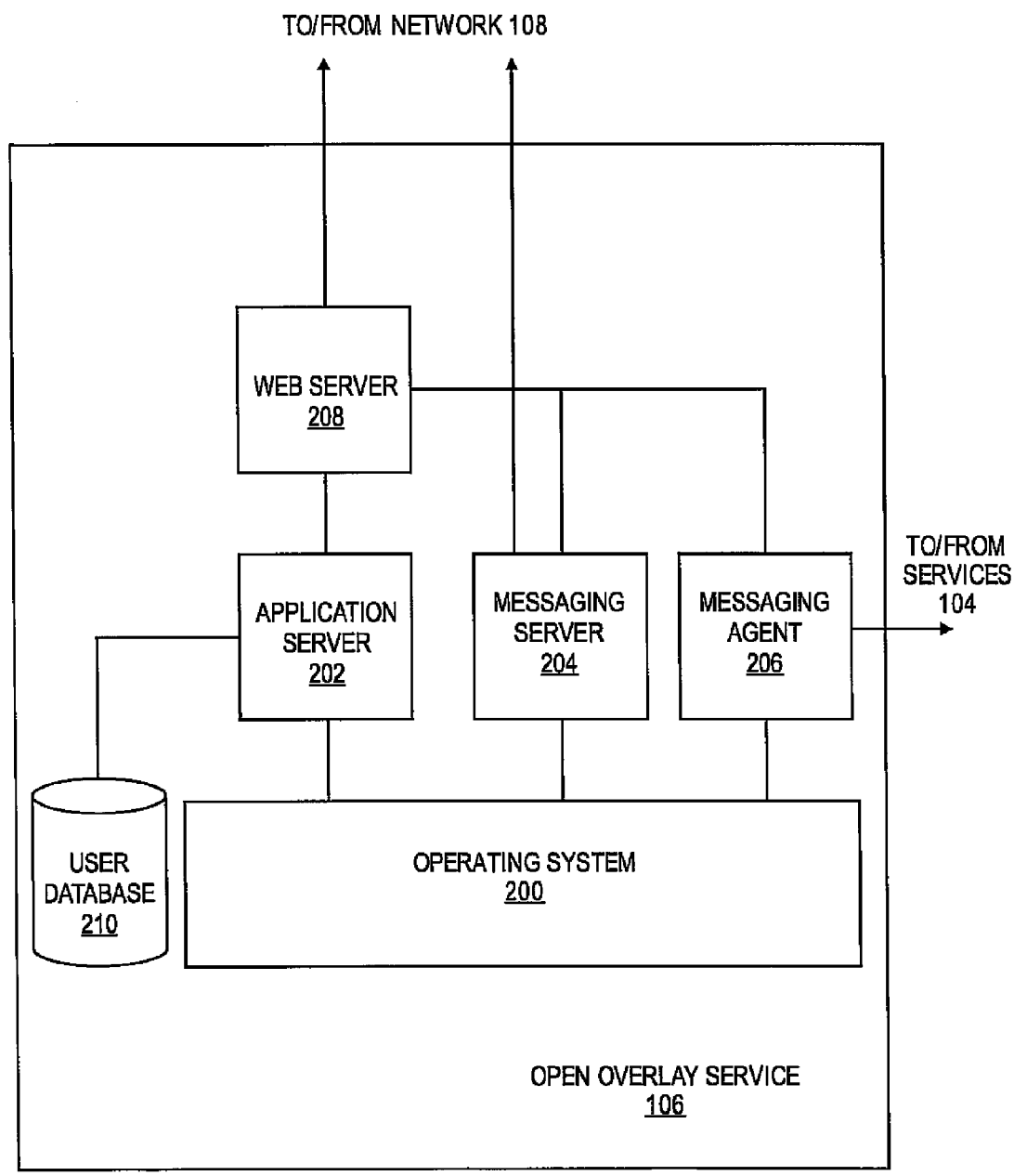
FIG. 2 illustrates an exemplary architecture for an open overlay service that is consistent with the principles of the present invention.

FIG. 2 illustrates an exemplary architecture for open overlay service 106 that is consistent with the principles of the present invention. As shown, open overlay service 106 may comprise an operating system 200, an application server 202, a messaging server 204, a messaging agent 206, a web server 208, and a user database 210. These components may be implemented as software, firmware, or some combination of both, which may be loaded into memory of the machine embodying open overlay service 106. The software components may be written in a variety of programming languages, such as C, C++, Java, etc. These components will now be generally described.

Operating system (OS) 200 is an integrated collection of routines that service the sequencing and processing of programs and applications running in open overlay service 106. OS 200 may provide many services, such as resource allocation, scheduling, input/output control, and data management. OS 200 may be predominantly software, but may also comprise partial or complete hardware implementations and firmware. Well known examples of operating systems that are consistent with the principles of the present invention include the Linux operating system, the UNIX operating system. In addition, OS 200 may operate in conjunction with other software, such as an application server, such as JBoss, to implement various features of open overlay service 106.

Application server 202 provides the logic for analyzing and managing the operations of open overlay service 106. As previously noted, application server 202 may be written in a variety of programming languages, such as C, C++, Java, etc.

For example, one responsibility of application server 202 may be managing the various identities of the users of open overlay service 106. As noted previously, a single person may have multiple identities that they use for various online services and social networks. For example, a person named, John Smith, may use jsmith@domain.com as an identity one service, but use smithj@domain2.com as his identity on another service.

In one embodiment, in order to track the various users of open overlay service 106, application server 202 may assign each user a unique identifier, such as a numeric identifier. Application server 202 may then utilize this unique identifier with the identity resources (i.e., email address, account names, screen names, etc.) used by services 104 to identify a person. In some embodiments, application server 202 generates a graph of each social network within open overlay service 106 in terms of person's names and the identity resources from the point of view of a particular user based on what is trusted by that user.

For example, given information about a person's name, their unique identifier assigned by application server 202, and associations to identity resources trusted by other users, application server 202 can generate a list of person names and identity resources (i.e., email address, account names, etc.) that should be visible to a particular user. Hence, the particular user will only be allowed to see identity resources they happen to (or only) know about that user and identity resources that have been verified by application server 202. For example, a user A may have a unique identifier of 2345, and email address #1 and email address #2 as identity resources. A user B may only know about email address 91 for user A. Meanwhile, a user C may similarly only know about email address #2 for user A. Thus, for user B, application server 202 will only allow user B to view and use email address #1 as an identity resource for user A. Likewise, application server 202 will only allow user C to view and use email address #2 as an identity resource for user A. However, if user A subsequently explicitly indicates to application server 202 that both users B and C can be trusted, then users B and C will then be also allowed to view both email addresses #1 and 2, as well. The primary uses of this information by open overlay service 106 may be for sharing a link with person by addressing that person either by an email address or by a short nickname, or for viewing a list of persons in open overlay service 106 that they think they know.

Application server 202 may also determine what information of a user should be public or private. In some embodiments, application server 202 may default to making information public, but provide an option, such as a checkbox, that allows the user to designate information as private. Application server 202 may also employ per page settings, such as all private or all public. Other privacy policies may be implemented by application server 202.

Application server 202 may further provide various search features. For example, application server 202 may allow users to search for other users based on various criteria, such as age, gender, school, etc. Application server 202 may also allow searches for various resources, such as email addresses, topics, links, etc.

Messaging server 204 manages communications between open overlay service 106 and clients 102 via network 108. For example, messaging server 204 may be configured to periodically poll clients 102 on a regular basis and have them request information from services 104. Messaging server 204 may be implemented based on well-known hardware and software and utilize well-known protocols, such as TCP/IP, hypertext transport protocol, etc.

Messaging server 204 may be configured to handle a wide variety of data and may handle data that is in any format. For example, information from clients 102 may be in the form of an extensible markup language (XML) file or a network location, such as a uniform resource locator (URL) on the Internet. Alternatively, messaging server 204 may be configured to obtain information from services 104 directly in a peer-to-peer fashion.

Messaging agent 206 serves as an interface between open overlay service 106 and online services 104 and may operate to monitor the activity of clients 102 at these services. In particular, messaging agent 206 may be a relatively small and focused computer application (or "bot") that runs continuously, in the background simultaneously for each of clients 102, as other programs are being run, and responds automatically to activity on services 104 that may be of interest to clients 102, such as new messages, postings, and the like.

Messaging agent 206 may be created by open overlay service 106 (i.e., by application server 202) for the benefit of the users at clients 102. Alternatively, for example, messaging server 204 may send information to clients 102 upon request, perform automated searches, or monitor messages or events at services 104.

In one embodiment, messaging server 204 and/or messaging agent 206 may work in conjunction to perform client-side data scraping on services 104. Client-side data scraping may be desirable in some instances where services 104 refuse or block a direct interface with open overlay service 106. For example, MySpace and AOL's instant messaging service may be implemented as one of services 104, but is known to block proxy requests for a client.

Client-side data scraping may be initiated by messaging server 204 or using information provided by messaging server. Messaging server 204 may poll client overlay client 302 to trigger a request to one of services 104. Accordingly, overlay client 302 may cause one of service applications 306 to interface with service 104 and request data from that service, such as web page refresh. Since the request originated from client 102, service 104 will provide a response. Overlay client 302 may detect this response and forward it to messaging server 204. Messaging server 204 may then pass this response. Of course, the polling may be configured at overlay client 302 based on information provided to messaging server 204.

Messaging server 204 evaluates the response and determines if a notification event is needed. If notification is needed, messaging server 204 send a message to overlay client 302. The notification may then be displayed to the user using, for example, browser 304 or service application 306.

One application of client-side data scraping may be used to detect when messages or postings have been entered on one of services 104. For example, on MySpace, users often repeatedly refresh their pages in anticipation of receiving a post or message from a friend. With client-side data scraping, open overlay service 106 may automatically perform this function, and more conveniently, indicate when the user has received activity on their MySpace page. This notification may appear in the form of a pop-up bubble or may be displayed as a link on the user's page in open overlay service 106. Of course, other applications of client-side data scraping are consistent with the principles of the present invention.

Web server 208 provides a communications interface between open overlay service 106, clients 102, and services 104. For example, web server 208 may be configured to provide information that indicates the status of client 102. Such communications may be based on well known protocols and programming languages, such as HTTP, TCP/IP and Java. Interfaces provided by web server 208 may be implemented using well known Internet technologies, such as web pages, which are well known to those skilled in the art.

User database 210 maintains information identifying users and clients 102. User database 210 may be implemented using well known database technology, such as relational databases, or object oriented databases.

For example, user database 210 may include information indicating one or more operating systems and applications installed on clients 102 as well as services subscribed to by users. User database 210 may also comprise information related to authenticating a user determining the respective rights of a user relative to other users. For example, a user may select various groups or channels of content in which they are interested in receiving information. User database 210 may further include information that indicates the permissions and delivery of the information to clients 102. Other information that may be included in user database 210 may comprise information, such as system and individual permissions of clients 102 on services 104, activation keys, registration information, and payment information (such as credit card information).

Furthermore, user database 210 may include other information related to the manner in which open overlay service 106 communicates with clients 102. For example, this information may relate to periodicity of notifications, email addresses, format of the information, and the like. User database 210 may include data structures to log the activities and transactions of its users. Activities, such as recent links, history of operations, etc., that may be logged in user database 210 are well known to those skilled in the art.

Figure 3:
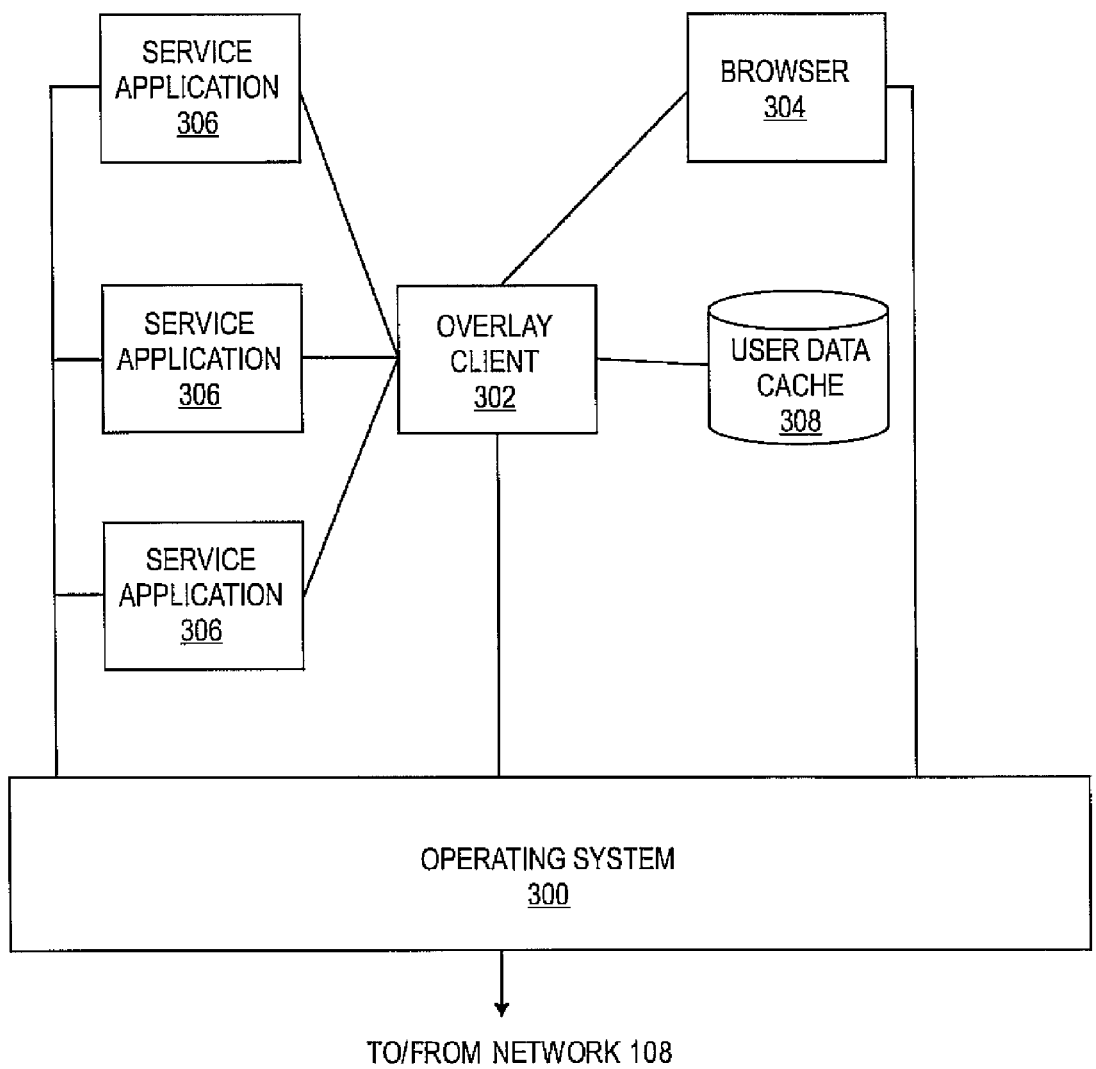
FIG. 3 illustrates an exemplary architecture for clients that are consistent with the principles of the present invention.

FIG. 3 illustrates an exemplary architecture for clients 102 that are consistent with the principles of the present invention. As noted, clients 102 may be implemented on a conventional device, such as personal computer, laptop, and the like. Such devices are well known to those skilled in the art and may typically include hardware, such as a processor, a memory, a display, a storage device, a keyboard, a mouse, and a network interface for network 108. Such hardware supports the operation of various components software. As shown, the software running on client 102 may comprise an operating system 300, an overlay client 302, a browser 304, one or more service applications 306, and a user data cache 308. Each of these software components will now be generally described.

Operating system (OS) 300 is an integrated collection of routines that service the sequencing and processing of programs and applications running in open overlay service 106. OS 300 may provide many services, such as resource allocation, scheduling, input/output control, and data management. OS 300 may be predominantly software, but may also comprise partial or complete hardware implementations and firmware. Well known examples of operating systems that are consistent with the principles of the present invention include Mac OS by Apple Computer, the Windows family of operating systems by Microsoft Corporation, and the Linux operating system.

Overlay client 302 maintains an inventory of the software and service applications 306 installed on client 102 and archives one or more states of activity on client 102. In some embodiments, overlay client 302 may be configured to periodically connect to open overlay service 106 and perform various operations requested by open overlay service 106.

Browser 304 is an application that runs on client 102 and provides an interface to access information on network 108, such as information on services 104. Browser 304 may be implemented as well known programs, such as Mozilla Firefox, Microsoft Internet Explorer, Netscape Navigator, and the like.

Service applications 306 run on client 102 to support the services provided by services 104. For example, service applications 306 may be applications, such as a browser, an instant messaging client, a music player (such as iTunes), and the like that are provided from services 104. Other examples for applications 306 are well known to those skilled in the art.

User data cache 308 provides a cache that indicates the activity of a user at client 102. For example, user data cache 308 may include information that indicates documents, such as HTML pages, images, URL links, web site access times, and the like.

In order for open overlay service 106 to provide a live social context, open overlay service 106 may need to provide various data integrity protocols in order to ensure that the various read/write/modify requests from clients 102 are handled appropriately. In some embodiments, application server 202 is implemented as a system of multiple nodes acting as servers for servicing requests from clients 102, which share a common data set from user database 210. In general, when one of the nodes updates the data set, it notifies the other nodes in open overlay service 106 in an asynchronous fashion.

If one of clients 102 sends an update request and gets a confirmation that the update succeeded, the nodes of application server 202 need to make sure that any subsequent read requests from the client are provided with the updated data. In order to accomplish this, when the client receives the confirmation in response to the update request, the confirmation is accompanied by a token that provides information about a state of the updated data set in user database 210 in open overlay service 106. When the client makes a subsequent read request, it passes the token along with the read request. In application server 202, the node receiving the read request then waits until it makes sure that it has received all notifications, if any, that precede the state of the updated data set represented by the token before it processes and responds to the read request.

The token may be, among other things, a physical timestamp, a counter reflecting transactions committed on user database 210, a "vector timestamp," which comprises a set of counters with one counter reflecting the state of each node in application server 202 at the point where an update from that node was last received and recorded by the node generating the timestamp, or a "Lamport timestamp," which is a single counter value cooperatively maintained by all the nodes in application server 202 when they exchange messages.

In addition, the nodes in application server 202 may use a similar technique to ensure ordering between read requests from clients 102. For example, if one of clients 102 makes two read requests, application server 202 may be configured to make the second read request always reflect a later system state than the first read request even if the subsequent read requests are handled by different nodes in application server 202. This feature is provided by having nodes in application server 202 send a token back with the response to each read request. Nodes in application server 202 may then block the handling of the next read request until the node handling that request has seen all the updates that were seen by the node handling the original request.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of ensuring integrity of data in a social network service, wherein the social network service comprises a plurality of nodes that share a data set, said method comprising:
   receiving, by a processor of a first node of the plurality of nodes, an update request from a client node to update the data set, wherein the first node stores a first copy of the data set;
   performing, by the first node, an update to the first copy of the data set in response to the update request;
   updating, by the processor of the first node, a first counter that reflects a state of the first copy of the data set, wherein the first counter is cooperatively maintained by the plurality of nodes to indicate the state of the data set when an update from the first node was last received and recorded by the first node;
   providing, by the processor of the first node, the client node with a token that comprises the first counter;
   notifying, by the processor of the first node, other nodes of the plurality of nodes of the update made to the first copy of the dataset, wherein the other nodes are notified of the update by the processor asynchronously;
   receiving, by a second node of the plurality of nodes, a read request for the data set from the client node, wherein the read request includes the token;
   comparing, by the second node, a state of the data set indicated by the first counter of the received token to a state of the data set at the second node indicated by a second counter at the second node; and
   when the state of the data set indicated by the second counter at the second node is not the same as the state of the data set indicated by the first counter of the received token, delaying, by the second node, responding to the read request of the client node until the state of the data set at the second node is updated to be the same as the state of the data set indicated by the first counter of the received token.

2. The method of claim 1, wherein the token comprises a physical timestamp.

3. The method of claim 1, wherein the token comprises a vector timestamp.

4. The method of claim 1, wherein the token comprises a Lamport timestamp.

5. A system for ensuring integrity of data in a social network service, wherein the social network service comprises a plurality of nodes that share a data set, the system comprising:
   a computer memory containing instructions and a first copy of the data set; and
   a processor of a first node of the plurality of nodes configured to execute the instructions to:
      receive a first update request from a client node to update the data set;
      perform an update on the first copy of the data set in response to the first update request;
      update a counter that reflects a state of the first copy of the data set, wherein the counter is cooperatively maintained by the plurality of nodes to indicate the state of the data set when an update from the first node was last received and recorded by the first node;
      provide the client node with a token that reflects a state of the counter when the update to the first copy of the data set was performed;
      notify other nodes of the plurality of nodes of the update made to the first copy of the data set, wherein the other nodes are notified of the update by the processor asynchronously;
      receive a second update request for the data set from the client node, wherein the second update request includes the token;
      compare a state of the data set indicated by the state of the counter reflected in the received token to a current state of the data set indicated by the counter; and
      when the state of the data set indicated by the state of the counter in the received token is not the same as the current state of the data set indicated by the counter, delay responding to the read request of the client node until additional changes to the data set are received by the first node.

6. The system of claim 5, wherein the token comprises a physical timestamp.

7. The system of claim 5, wherein the token comprises a vector timestamp.

8. The system of claim 5, wherein the token comprises a Lamport timestamp.

9. A method of ensuring integrity of data in a social network service, wherein the social network service comprises a plurality of nodes that share a data set, and wherein each node of the plurality of nodes stores its own copy of the data set, said method comprising:
   receiving, by a processor of a first node of the plurality of nodes, a first update request from a client node to update the data set;

performing, by the processor of the first node, an update on the copy of the data set at the stored at the first node in response to the first update request;

updating, by the processor of the first node, a counter to reflect a state of the copy of the data set at the first node, wherein the counter is cooperatively maintained by the plurality of nodes to indicate a current state of the data set;

providing, by the first node, the client node with a token that reflects a state of the counter when the update to the copy of the data set at the first node was performed;

notifying, by the processor of the first node, other nodes of the plurality of nodes of the update made to the copy of the data set at the first node, wherein the other nodes are notified of the update by the processor asynchronously;

receiving, by the processor of the first node, a second update request for the data set from the client node, wherein the second update request includes the token;

comparing, by the processor of the first node, a state of the data set reflected by the received token to a current state of the data set indicated by the counter; and when the state of the data set reflected by the received token is not the same as the current state of the data set indicated by the counter, delaying, by the processor of the first node, responding to the read request of the client node until additional changes to the data set are received by the first node.

10. The method of claim 9, wherein the token comprises a physical timestamp.

11. The method of claim 9, wherein the token comprises a vector timestamp.

12. The method of claim 9, wherein the token comprises a Lamport timestamp.

13. The method of claim 9, wherein the received token includes a copy of the counter reflecting a state of a copy of the data set at the client node when the client node sent the second update request.

* * * * *